US010999183B2

(12) United States Patent
Joseph et al.

(10) Patent No.: US 10,999,183 B2
(45) Date of Patent: May 4, 2021

(54) LINK STATE ROUTING PROTOCOL ADJACENCY STATE MACHINE

(71) Applicant: Juniper Networks, Inc., Sunnyvale, CA (US)

(72) Inventors: William Britto Arimboor Joseph, Bangalore (IN); Bharath RadhaKrishna Bhat, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/538,586

(22) Filed: Aug. 12, 2019

(65) Prior Publication Data

US 2021/0051091 A1 Feb. 18, 2021

(51) Int. Cl.
*H04L 12/751* (2013.01)
*H04L 29/08* (2006.01)
(Continued)

(52) U.S. Cl.
CPC ............ *H04L 45/026* (2013.01); *H04L 12/18* (2013.01); *H04L 45/12* (2013.01); *H04L 45/32* (2013.01);
(Continued)

(58) Field of Classification Search
CPC ....... H04L 45/026; H04L 12/18; H04L 45/12; H04L 45/32; H04L 61/2542; H04L 69/14;
(Continued)

(56) References Cited

U.S. PATENT DOCUMENTS

| 5,570,084 A | 10/1996 | Ritter et al. |
| 6,760,328 B1 | 7/2004 | Ofek |

(Continued)

FOREIGN PATENT DOCUMENTS

| CN | 105376162 A | 3/2016 |
| CN | 105591937 A | 5/2016 |

(Continued)

OTHER PUBLICATIONS

Katz et al., "Three -Way Handshake for IS-IS Point-to-Point Adjacencies," Network Working Group, RFC 5303, Oct. 2008, 12pp. (Year: 2008).*

(Continued)

*Primary Examiner* — Ayaz R Sheikh
*Assistant Examiner* — Louis Samara
(74) *Attorney, Agent, or Firm* — Shumaker & Sieffert, P.A.

(57) ABSTRACT

Techniques are disclosed for a link state routing protocol adjacency state machine. The adjacency state machine ensures that first and second logical links using different networking protocols are established on a single physical link between two network devices prior to indicating adjacency between the network devices. In some examples, the adjacency state machine determines that both the first and second links are active in response to determining that hello messages are generated by both network devices for both links. In some examples, the adjacency state machine determines that both the first and second logical links are active upon expiration of a predetermined time corresponding to a time required for a duplicate address detection (DAD) operation to complete. In some examples, the first and second logical links use Internet Protocol version 4 (IPv4) and Internet Protocol version 6 (IPv6), respectively.

20 Claims, 4 Drawing Sheets

(51) Int. Cl.
*H04L 29/12* (2006.01)
*H04L 12/18* (2006.01)
*H04L 12/721* (2013.01)
*H04L 29/06* (2006.01)

(52) U.S. Cl.
CPC .......... *H04L 61/2542* (2013.01); *H04L 69/14* (2013.01); *H04L 69/324* (2013.01); *H04L 61/6086* (2013.01)

(58) Field of Classification Search
CPC ... H04L 69/324; H04L 61/6086; H04L 45/52; H04L 43/50
See application file for complete search history.

(56) References Cited

U.S. PATENT DOCUMENTS

| | | | |
|---|---|---|---|
| 6,985,490 B2 | 1/2006 | Czeiger et al. | |
| 7,042,838 B1 | 5/2006 | Shand et al. | |
| 7,099,286 B1 | 8/2006 | Swallow | |
| 7,178,059 B2 | 2/2007 | Greenspan et al. | |
| 7,184,437 B1 | 2/2007 | Cole et al. | |
| 7,519,006 B1 | 4/2009 | Wing | |
| 7,522,603 B2 | 4/2009 | Vasseur | |
| 7,602,778 B2 | 10/2009 | Guichard et al. | |
| 7,710,872 B2 | 5/2010 | Vasseur | |
| 7,808,919 B2 | 10/2010 | Nadeau et al. | |
| 7,937,492 B1 | 5/2011 | Kompella et al. | |
| 7,965,699 B1 | 6/2011 | Accardi et al. | |
| 8,027,354 B1 | 9/2011 | Portolani et al. | |
| 8,077,726 B1 | 12/2011 | Kumar et al. | |
| 8,339,959 B1 | 12/2012 | Moisand et al. | |
| 8,611,359 B1 | 12/2013 | Kompella | |
| 8,699,499 B2 | 4/2014 | Mulligan et al. | |
| 8,909,602 B2 | 12/2014 | Soundararajan et al. | |
| 8,954,601 B1 | 2/2015 | Patro | |
| 8,959,185 B2 | 2/2015 | Nakil et al. | |
| 9,155,020 B1* | 10/2015 | Graffagnino | H04L 45/12 |
| 9,444,721 B2 | 9/2016 | Zhang et al. | |
| 10,200,204 B2 | 2/2019 | Wang | |
| 2002/0133756 A1 | 9/2002 | Jain | |
| 2003/0137978 A1 | 7/2003 | Kanetake | |
| 2004/0042406 A1 | 3/2004 | Wu et al. | |
| 2004/0223497 A1 | 11/2004 | Sanderson et al. | |
| 2005/0041676 A1 | 2/2005 | Weinstein | |
| 2005/0220014 A1 | 10/2005 | DelRegno et al. | |
| 2006/0256724 A1 | 11/2006 | Martini et al. | |
| 2007/0086363 A1 | 4/2007 | Wakumoto | |
| 2007/0195797 A1 | 8/2007 | Patel et al. | |
| 2007/0260746 A1 | 11/2007 | Mirtorabi et al. | |
| 2008/0025309 A1 | 1/2008 | Swallow | |
| 2008/0056264 A1 | 3/2008 | Ong | |
| 2008/0151768 A1 | 6/2008 | Liu | |
| 2008/0151783 A1 | 6/2008 | Bamba | |
| 2010/0061242 A1 | 3/2010 | Sindhu et al. | |
| 2010/0208741 A1 | 8/2010 | Vasseur | |
| 2011/0103228 A1 | 5/2011 | Sheth et al. | |
| 2012/0069847 A1 | 3/2012 | Saad | |
| 2012/0224506 A1* | 9/2012 | Gredler | H04L 45/121 370/254 |
| 2013/0074066 A1 | 3/2013 | Sanzgiri et al. | |
| 2013/0163606 A1 | 6/2013 | Bagepalli et al. | |
| 2013/0232492 A1 | 9/2013 | Wang | |
| 2013/0329571 A1 | 12/2013 | Shimokawa et al. | |
| 2014/0269407 A1* | 9/2014 | Anand | H04L 45/28 370/254 |
| 2014/0341109 A1* | 11/2014 | Cartmell | H04L 43/50 370/328 |
| 2015/0350058 A1 | 12/2015 | Wei | |
| 2017/0034039 A1 | 2/2017 | Yadlapalli et al. | |
| 2017/0041211 A1* | 2/2017 | Pandya | H04L 45/64 |
| 2017/0366444 A1 | 12/2017 | Ansari et al. | |

FOREIGN PATENT DOCUMENTS

| | | | | |
|---|---|---|---|---|
| EP | 2458793 A1 * | 5/2012 | ............. | H04L 45/70 |
| EP | 2458793 A1 | 5/2012 | | |
| EP | 2571208 A1 | 3/2013 | | |

OTHER PUBLICATIONS

Shirasaki et al., "A Model of IPv6/IPv4 Dual Stack Internet Access Service," Network Working Group, RFC 4241, Dec. 2005, 11pp. (Year: 2005).*

Harrison, et al., "IPv6 Traffic Engineering in IS-IS," Internet Engineering Task Force ((IETF) Request for Comment: 6119, Feb. 2011, p. 10. (Year: 2011).*

Extended Search Report from counterpart European Application No. 19206918.5, dated Apr. 1, 2020, 8 pp.

"Understanding OSPF Sham Links," Juniper Networks, retrieved from http://www.juniper.net/techpubs/en_US/ junose15.1/topics/concept/ospf-sham-links-overview.html, Aug. 18, 2014, 2 pp.

Aggarwal et al. "MPLS Upstream Label Assignment and Context-Specific Label Space", IETF RFC 5331, Network Working Group, Aug. 2008, 14 pp.

Atlas, "Basic Specification for IP Fast Reroute: Loop-Free Alternates" Network Working Group, RFC 5286, Sep. 2008, 32 pgs.

Berger, "The OSPF Opaque LSA Option" Network Working Group, RFC 5250, Jul. 2008, 18 pgs.

Clausen et al., "The Optimized Link State Routing Protocol Version 2," Mobile Ad hoc Networking (MANET), Internet Draft, draft-ietf-manet-olsrv2-17, Oct. 14, 2012, 110 pp.

Cloud Computing and Security—A Natural Match, Trusted Computing Group, Apr. 2010, 5 pp.

Coltun et al., "OSPF for IPv6," RFC 5340, Network Working Group, Jul. 2008, 94 pp.

Hegde et al., "Advertising per-node administrative tags in OSPF," Open Shortest Path First IGP Internet Draft, draft-ietf-ospf-node-admin-tag-09, Nov. 17, 2015, 15 pp.

Ishiguro, "Traffic Engineering Extensions to OSPF Version 3", Network Working Group, RFC 5329, Sep. 2008, 13 pgs.

Katz et al. "Traffic Engineering (TE) Extensions to OSPF Version 2" Network Working Group, RFC 3630, Sep. 2003, 14 pgs.

Kompella et al. "IS-IS Extensions in Support of Generalized Multi-Protocol Label Switching (GMPLS)" Network Working Group, RFC 5307, Oct. 2008, 13 pgs.

Li et al. "IS-IS Extensions for Traffic Engineering" Network Working Group, RFC 5305, Oct. 2008, 18 pgs.

Lindem et al. "Extensions to OSPF for Advertising Optimal Router Capabilities" Network Working Group, RFC 4970, Jul. 2007, 13 pgs.

Lindem et al., "OSPFv3 LSA Extendability," Network Working Group Internet Draft, draft-acee-ospfv3-lsa-extend-01.txt, Jul. 15, 2013, 27 pp.

Litkowski, "Operational Management of Loop Free Alternates" draft-litkowski-rtgwg-lfa-manageability-01, Routing Area Working Group, Internet-Draft, Feb. 18, 2013, 17 pgs.

Mohapatra et al., "The Accumulated IGP Metric Attribute for BGP," RFC 7311, Internet Engineering Task Force (IETF), Aug. 2014, 15 pp.

Moy, "OSPF Version 2," RFC 2328, Network Working Group, Apr. 1998, 197 pp.

Oran, "OSI IS-IS Intra-domain Routing Protocol," RFC 1142, Network Working Group, Feb. 1990, 157 pp.

Osborne, "Extended Administrative Groups in MPLS-TE" draft-osborne-mpls-entended-admin-groups-00, Network Working Group, Internet-Draft, Feb. 13, 2013, 5 pgs.

Osborne, Eric and Ajay Simha "How CSPF Works" Traffic Engineering with MPLS: Chapter 4, Publisher: Cisco Press, Jul. 17, 2002, available at http://cisco-press-traffic-engineering.org.ua/1587050315/ch04lev1sec2.html (accessed Jun. 21, 2011).

Previdi, "A Policy Control Mechanism in IS-IS Using Administrative Tags", Network Working Group, RFC 5130, Feb. 2008, 9 pgs.

Rekhter et al., "A Border Gateway Protocol 4 (BGP-4)," RFC 4271, Network Working Group, Jan. 2006, 104 pp.

(56) References Cited

OTHER PUBLICATIONS

Rekhter et al., "Carrying Label Information in BGP-4," RFC 3107, Network Working Group, May 2001, 8 pp.

Rosen et al., "MPLS Label Stack Encoding," RFC 3032, Network Working Group, Jan. 2001, 24 pp.

Rosen et al., "OSPF as the Provider/Customer Edge Protocol for BGP/MPLS IP Virtual Private Networks (VPNs)," RFC 4577, Network Working Group, Jun. 2006, 25 pp.

Sheth et al., "OSPF Hybrid Broadcast and Point-to-Multipoint Interface Type," RFC 6845, Internet Engineering Task Force (IETF), Jan. 2013, 9 pp.

TCG Trusted Network Connect, TNC IF-MAP Binding for SOAP, Specification version 2.1, Revision 15, May 7, 2012, 81 pp.

Trusted Multi-Tenant Infrastructure Work Group FAQ, Trusted Computing Group, Sep. 2010, 2 pp.

Ayer, "Beware the IPv6 DAD Race Condition," Blog, Nov. 29, 2012, 5 pp.

"Dual Stack Network," Cisco, Oct. 15, 2010, 2 pp.

"Information technology—Telecommunications and information exchange between systems—Intermediate system to Intermediate system intra-domain routeing information exchange protocol for use in conjunction with the protocol for providing the connectionless-mode Network Service (ISO 8473)," International Standard, ISO/IEC 10589, 1992, 155 pp.

"systemd-networkd-wait-online: Wait ALL links to gain a carrier," Issue #2037, Github, Nov. 26, 2015, 5 pp.

Callon, "Use of OSI IS-IS for Routing in TCP/IP and Dual Environments," Network Working Working Group, RFC 1195, Dec. 1990, 86 pp.

Przygienda et al., "M-ISIS: Multi Topology (MT) Routing in Intermediate System to Intermediate Systems (IS-ISs)," Network Working Group, RFC 5120, Feb. 2008, 15 pp.

Shirasaki et al., "A Model of IPv6/IPv4 Dual Stack Internet Access Service," Network Working Group, RFC 4241, Dec. 2005, 11 pp.

Katz et al., "Three-Way Handshake for IS-IS Point-to-Point Adjacencies," Network Working Group, RFC 5303, Oct. 2008, 12 pp.

* cited by examiner

LINK STATE ROUTING PROTOCOL ADJACENCY STATE MACHINE

TECHNICAL FIELD

The invention relates to computer networks and, more particularly, to routing of network traffic within computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols use flooding-based distribution mechanisms to distribute topology information to routers within the network. These routing protocols may rely on routing algorithms that require each of the routers to have synchronized routing topology information. For example, Open Shortest Path First (OSPF) and Intermediate System to Intermediate System (IS-IS) routing protocols are link state protocols that use messages conveying link state representations to ensure the routing topology is synchronized with respect to available interfaces, metrics and other variables associated with network links. For example, OSPF utilizes Link State Advertisements (LSAs) while IS-IS uses Link State Protocol Data Units (PDUs) to exchange information. Messages used to convey link state representations in accordance with a link state routing protocol are generally referred to herein as link state advertisements (LSAs), and OSFP LSAs and IS-IS LS PDUs are examples of such LSAs.

A router operating in accordance without a link state routing protocol may flood link state advertisements throughout the network such that every other router receives the link state advertisements. In network topologies where routers are connected by point-to-point connections, each router floods link state advertisements to adjacent routers reachable on each interface to ensure synchronization. In networks using multi-access media, such as an Ethernet network, the routers within the network flood the link state advertisements to all other routers. In either case, the receiving routers construct and maintain their own network topologies using the information received via the link state advertisements. These link state advertisements may include information identifying constraints employed for selecting a path through a network in accordance with a link state protocol.

A router operating in accordance with link state routing protocol may use different networking protocol versions. For example, a router may use Internet Protocol version 4 (IPv4). IPv4 is a 32-bit logical addressing system that enables the forwarding of packets from a source host to the next router that is one hop closer to the intended destination host on another network. As another example, a router may use Internet Protocol version 6 (IPv6). IPv6 is intended to replace IPv4 and provides a larger address space (e.g., 128 bits) compared to the 32-bit address space employed by IPv4, permits hierarchical address allocation, and simplifies multicast addressing. Many networks are replacing IPv4 with IPv6 because of the numerous advantages IPv6 provides. IPv6 is not inter-operable with IPv4. However, many networks provide backwards compatibility with IPv4 by requiring network devices to concurrently support the processing and forwarding of network traffic addressed using either the IPv4 or the IPv6 networking protocols. As such, the router may obtain and allocate, for a link, both an IPv4 address and an IPv6 address, advertising the link via the link state routing protocol each time the IPv4 address and the IPv6 address is allocated.

SUMMARY

Techniques are disclosed for a link state routing protocol adjacency state machine (hereinafter also referred to as an "adjacency state machine"). In some examples, the link state routing protocol adjacency state machine is a modified Intermediate System to Intermediate System (IS-IS) adjacency state machine in a dual-stack IS-IS network running a default unicast topology. A dual-stack IS-IS network uses both IPv4 and IPv6 networking protocols on each physical link between network devices. The link state routing protocol adjacency state machine ensures that a first logical link and a second logical link for a single physical link between two network devices are active prior to indicating adjacency between the two network devices. In some examples, the first logical link is established according to a first networking protocol and the second logical link is established according to a second networking protocol. For example, the first logical link uses the IPv4 networking protocol and the second logical link uses the IPv6 networking protocol.

The adjacency state machine described herein may avoid dropping network traffic in situations where a physical link between two network devices is selected as a shortest path for both IPv4 and IPv6 traffic based on an adjacency path calculation for an IPv4 logical link for the physical link, but prior to an IPv6 address being allocated to the IPv6 interfaces of the two network devices for the IPv6 logical link. Such a situation may arise, for example, when the physical link between the two network devices is disabled and re-enabled or during link "flapping." IPv4 addresses for the IPv4 interfaces of the network devices for the IPv4 logical link may be allocated relatively quickly, while the IPv6 interfaces of the network devices may not be allocated IPv6 addresses for an extended period of time while an address allocation operation for the IPv6 logical link resolves. The adjacency state machine described herein may ensure that interfaces of the network devices for both the IPv4 and IPv6 logical links have been assigned addresses such that both the IPv4 and IPv6 logical links are in an "active" state prior to indicating that the two network devices are adjacent, instead of relying only on an "active" status of the IPv4 logical link as indicating adjacency between the two network devices. In this fashion, a network device using the adjacency state machine described herein may avoid attempting to forward IPv6 traffic across the IPv6 logical link where the IPv6 logical link is not yet "active," thereby reducing IPv6 traffic blackholing.

The adjacency state machine may determine that both the first and second logical links are active in response to determining that both network devices have output hello messages (in accordance with the link state routing protocol) to one another for both logical links. For example, the adjacency state machine determines that the first logical link is active in response to determining that both network devices have output IPv4 IS-IS Hello (IIH) Protocol Data Units (PDUs) to one another. Additionally, the adjacency state machine may determine that the second logical link is active in response to determining that both network devices have output IPv6 IIH PDUs to one another. In another example, the adjacency state machine determines that both the first and second logical links are active upon expiration of a predetermined amount of time. The predetermined amount of time may correspond to an amount of time typically required for the second logical link to become active. As an example where the second logical link is established according to IPv6, the predetermined amount of time corresponds to a time required for a duplicate address detection (DAD) operation for the second logical link between the two network devices to complete.

In one example, this disclosure describes a method comprising: determining, by a link state routing protocol adjacency state machine executed by processing circuitry of a first network device of a plurality of network devices in a network operating in accordance with a link state routing protocol, that a first logical link according to a first networking protocol is active, wherein the first logical link is established on a first physical link between the first network device and a second network device of the plurality of network devices; determining, by the adjacency state machine, that a second logical link according to a second networking protocol is active, wherein the second logical link is established on the first physical link between the first network device and the second network device, and wherein the first networking protocol and second networking protocol are different; and in response to determining that the first logical link is active and determining that the second logical link is active: outputting a first link state routing advertisement advertising the first logical link; and outputting a second link state routing advertisement advertising the second logical link.

In another example, this disclosure describes a first network device of a plurality of network devices in a network operating in accordance with a link state routing protocol, the first network device comprising processing circuitry configured to: execute a link state routing protocol adjacency state machine configured to: determine that a first logical link according to a first networking protocol is active, wherein the first logical link is established on a first physical link between the first network device and a second network device of the plurality of network devices; and determine that a second logical link according to a second networking protocol is active, wherein the second logical link is established on the first physical link between the first network device and the second network device, and wherein the first networking protocol and second networking protocol are different; and in response to determining that the first logical link is active and determining that the second logical link is active: output a first link state routing advertisement advertising the first logical link; and output a second link state routing advertisement advertising the second logical link.

In another example, this disclosure describes a non-transitory, computer-readable medium comprising instructions that, when executed, are configured to cause processing circuitry of a first network device of a plurality of network devices in a network operating in accordance with a link state routing protocol to: execute a link state routing protocol adjacency state machine configured to: determine that a first logical link according to a first networking protocol is active, wherein the first logical link is established on a first physical link between the first network device and a second network device of the plurality of network devices; and determine that a second logical link according to a second networking protocol is active, wherein the second logical link is established on the first physical link between the first network device and the second network device, and wherein the first networking protocol and second networking protocol are different; and in response to determining that the first logical link is active and determining that the second logical link is active: output a first link state routing advertisement advertising the first logical link; and output a second link state routing advertisement advertising the second logical link.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
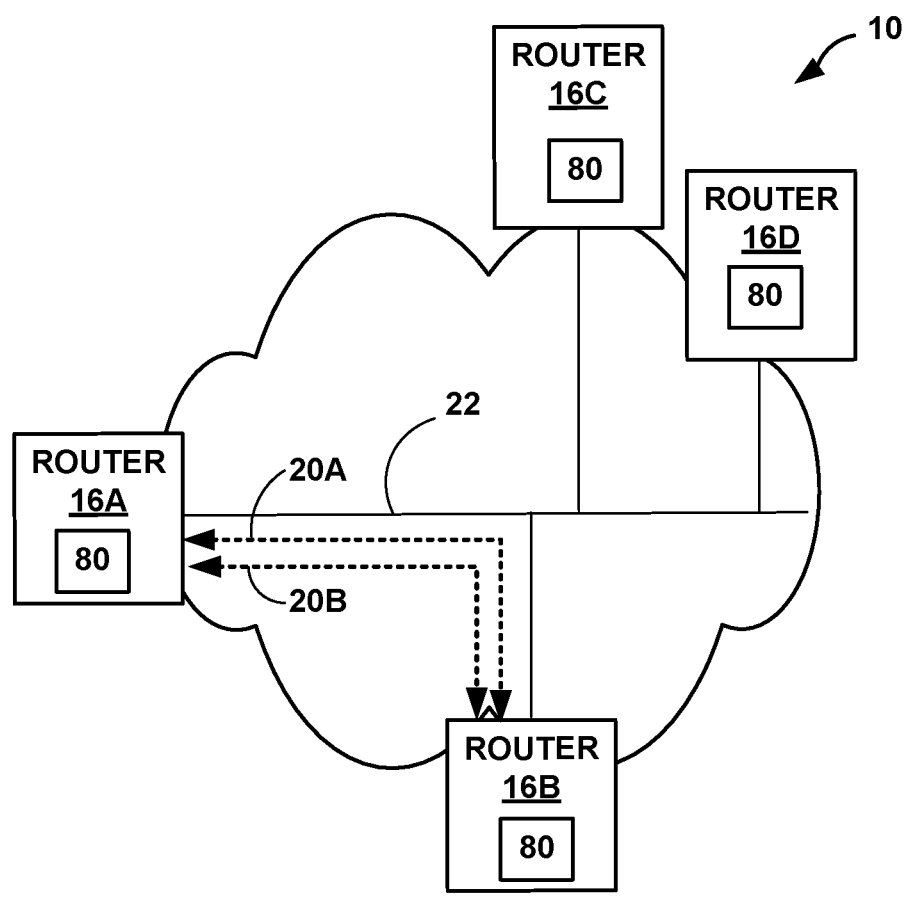
FIG. 1 is a block diagram illustrating an example network that operates in accordance with the techniques of the disclosure.

FIG. 1 is a block diagram illustrating an example network 10 that operates in accordance with various aspects of the techniques described in this disclosure. In the example of FIG. 1, network 10 includes routers 16A-16D ("routers 16") interconnected by one or more physical links 22. In the example of FIG. 1 and as described in more detail below, router 16A and router 16B have established a first logical link 20A and a second logical link 20B to one another over a single physical link 22. In some examples network 10 is a shared media access network.

In this example, routers 16 of network 10 implement link state routing protocols to exchange routing information and facilitate forwarding of packets or other data units between endpoint devices throughout the network. As one example, network 10 may be an Ethernet network coupling routers 16. Network 10 may be coupled to one or more networks administered by other providers, and may thus form part of a large-scale public network infrastructure, e.g., the Internet.

Each of routers 16 operate in accordance with a link state routing protocol to exchange link state advertisements carrying routing information. For example, routers 16 may execute the Open Shortest Path First (OSPF) routing protocol or the Intermediate System to Intermediate System (IS-IS) routing protocol, each of which is an example of a link state routing protocol that uses link state advertisements to convey available interfaces, metrics and other variables associated with network links. For example, OSPF utilizes Link State Advertisements (LSAs) while IS-IS uses Link-state protocol Data Units (PDUs) to exchange information. Messages used to convey link state representations in accordance with a link state routing protocol are generally referred to herein as link state advertisements (LSAs), and OSFP LSAs and IS-IS LS PDUs are examples of such LSAs.

In general, link state advertisements output by routers 16 specify network links to other routers within network 10. Based on the communicated link state advertisements, routers 16 construct a graph or other data structure in a manner that reflects the topology of network 10. For example, routers 16 may form a graph data structure with each node of the graph representing a different one of routers 16 or a shared-access network and each edge interconnecting two nodes of the graph representing a different link between a corresponding two of routers 16, or between a router and a shared-access network. Each edge of the graph may be associated with a cost or other edge value that reflects the costs advertised via the LSAs for each of the associated links. Routers 16 may then implement a path selection algorithm to determine paths through the network for each source and destination of data packets. For example, routers 16 may implement a shortest path first (SPF) or constrained shortest path first (CSPF) path selection algorithm to find lowest cost paths from each node to every other node.

After performing path selection, routers 16 forward packets in accordance with the selected paths. As network conditions change, such as when one of routers 16 becomes inoperable, a link transitions to a "down" or "inactive" state, or becomes over-consumed and slow, one or more of routers 16 may detect the change in network conditions and output link state advertisements to communicate the changes to the other ones of routers 16. Routers 16 process the link state advertisements to update their respective link state databases, and perform path selection based on an updated graph data structure to select new paths through network 10.

In the example of FIG. 1, routers 16 execute the IS-IS protocol. For example, network 10 implements a dual-stack IS-IS network running, e.g., default unicast topology. IS-IS is an interior gateway protocol, designed for use within an administrative domain or network. As compared with OSPF, IS-IS is a OSI-model Layer-2 link-state routing protocol. IS-IS is neutral regarding the type of network addresses for which it can route, and so may support IPv4 or IPv6 networking protocols. IS-IS routers, such as routers 16, may be designated as being: Level 1 (intra-area); Level 2 (inter area); or Level 1-2 (both). Routing information is exchanged between Level 1 routers and other Level 1 routers of the same area, and Level 2 routers can only form relationships and exchange information with other Level 2 routers. Level 1-2 routers exchange information with both levels and are used to connect the inter area routers with the intra area routers. Additional information regarding the implementation of IS-IS is described in Intermediate System to Intermediate System Routing Exchange Protocol for Use in Conjunction with the Protocol for Providing the Connectionless-Mode Network Service, International Organization for Standardization, ISO 10589 (Apr. 30, 1992) and in R. Callon, "Use of OSI IS-IS for Routing in TCP/IP and Dual Environments," RFC 1195 (December 1990), available at https://tools.ietf.org/html/rfc1195, the entire content of each of which is incorporated by reference herein.

A Multi-Topology (MT) IS-IS network is one type of solution for migrating a network from the use of the IPv4 networking protocol to the IPv6 networking protocol. MT IS-IS is an optional mechanism for IS-IS that allows the use of a set of independent IP topologies called Multi-Topologies (MTs) within a single IS-IS domain. The MT extension can be used for a variety of purposes, such as an in-band management network "on top" of the original IGP topology, maintaining separate IGP routing domains for isolated multicast or IPv6 islands within the backbone, or forcing a subset of an address space to follow a different topology. For example, MT IS-IS allows a first MT to use an IPv4 networking protocol and a second MT to use an IPv6 networking protocol, within a single IS-IS domain. MT IS-IS removes the restriction that all interfaces of the network devices on which IS-IS is configured must support an identical set of networking protocols. MT IS-IS also removes the restriction that all network devices in the IS-IS area (for Level 1 routing) or domain (for Level 2 routing) must support an identical set of networking protocols.

Because multiple Shortest Path First (SPF) operations are performed, one for each configured topology, an MT IS-IS network only requires that connectivity exists among a subset of the network devices in the area or domain for a given network address family to be routable. Additional information regarding the implementation of Multi-Topology (MT) IS-IS is described in T. Przygienda et al., "M-ISIS: Multi Topology (MT) Routing in Intermediate System to Intermediate Systems (IS-ISs)," RFC 5120 (February 2008), available at https://tools.ietf.org/html/rfc5120, the entire content of which is incorporated by reference herein. While MT IS-IS offers flexibility over IS-IS for supporting both IPv4 and IPv6 networking protocols, customers may prefer not to adopt MT IS-IS. For example, the use of MT IS-IS increases the administrative burden of a network because MT IS-IS implements a separate network topology for IPv4 and IPv6 networking protocols, thereby increasing the number of network topologies that an administrator must configure, maintain, and upgrade a network.

Another type of solution for migrating a network from IPv4 to IPv6 is a dual-stack IS-IS network. In a dual-stack IS-IS network, all of the network devices operate according to both the IPv4 and the IPv6 networking protocols such that the network devices are capable of processing both IPv4 and IPv6 traffic. To enable a dual-stack IS-IS network, each interface of each of routers 16 is assigned an IPv4 address and an IPv6 address. Dual-stack IS-IS networks are more popular than MT IS-IS networks because dual-stack IS-IS networks are cheaper and easier to implement. For example, dual-stack IS-IS networks do not require tunneling mechanisms or internal networks. Further, IPv4 and IPv6 forwarding and routing may execute independently of one another. Furthermore, dual-stack IS-IS networks allow for the gradual migration of endpoints, networks, and applications from the use of the obsolete IPv4 networking protocol to the newer IPv6 networking protocol. Additional information regarding the implementation of Dual-Stack IS-IS is described in Y. Shirasaki et al., "A Model of IPv6/IPv4 Dual Stack Internet Access Service," RFC 4241 (December 2005), available at https://tools.ietf.org/html/rfc4241, the entire content of which is incorporated by reference herein.

As depicted in the example of FIG. 1, first logical link 20A and second logical link 20B are established between router 16A and router 16B over a single physical link 22. In some examples, first logical link 20A operates in accordance with a first networking protocol and second logical link 20A operates in accordance with a second networking protocol that is different from the first networking protocol. In some examples, the first networking protocol is IPv4 and the second networking protocol is IPv6.

In accordance with the techniques of the disclosure, each of routers 16 implement link state routing protocol adjacency state machine 80. Link state routing protocol adjacency state machine 80 (hereinafter, "adjacency state machine 80") of router 16A ensures that first logical link 20A and second logical link 20B are in an "active" state prior to indicating adjacency between router 16A and router 16B. For example, adjacency state machine 80 determines that the first logical link 20A is in an "active" state by determining that the interfaces of router 16A and router 16B for first logical link 20A have been assigned addresses in accordance with the first networking protocol. As another example, adjacency state machine 80 determines that the second logical link 20B is in an "active" state by determining that the interfaces of router 16A and router 16B for first logical link 20B have been assigned addresses in accordance with the second networking protocol.

In some examples, link state routing protocol adjacency state machine 80 is a modified IS-IS adjacency state machine in dual-stack IS-IS network 10 running a default unicast topology. For example, dual-stack IS-IS network 10 uses an IPv4 networking protocol on logical link 20A and an IPv6 networking protocol on logical link 20B, wherein both logical links 20A and 20B are established on a single physical link 22 between router 16A and 16B. In some examples, adjacency state machine 80 determines that both the first and second logical links 20A, 20B are active upon expiration of a predetermined amount of time. The predetermined amount of time may correspond to a time required for an address allocation process to resolve for the interfaces of routers 16A and 16B that make up the second logical link 20B. For example, where the second logical link 20B operates in accordance with the IPv6 networking protocol, the predetermined amount of time may correspond to an amount of time required for a DHCP server to perform a duplicate address detection (DAD) operation to ensure that there are no duplicate addresses assigned within the same network.

In some examples, adjacency state machine 80 determines that both the first and second logical links 20A, 20B between router 16A and router 16B are active in response to determining that both router 16A and router 16B have output hello messages to one another for both logical links 20A and 20B. For example, adjacency state machine 80 determines that first logical link 20A is active in response to determining that both network devices 16A, 16B have output IPv4 IS-IS Hello (IIH) Protocol Data Units (PDUs) to one another. In some examples, adjacency state machine 80 determines that second logical link 20B is active in response to determining that both network devices 16A, 16B have output IPv6 IIH PDUs to one another.

The adjacency state machine described herein may avoid dropping network traffic in situations where physical link 22 between router 16A and router 16B is selected as a shortest path for, e.g., traffic according to the first networking protocol and traffic according to the second networking protocol based on an adjacency path calculation for only logical link 20A according to the first networking protocol. In a situation where logical link 20B is not yet in an "active" state, forwarding the traffic according to the second networking protocol along logical link 20B may result in dropping the traffic.

Such a situation may arise, for example, in a network where logical link 20A operates in accordance with the IPv4 networking protocol and logical link 20B operates in accordance with the IPv6 networking protocol. Physical link 22 between routers 16A, 16B may become disabled and re-enabled, or, in other words, may undergo link "flapping." Interfaces of network devices 16A, 16B for logical link 20A, which operates in accordance with the IPv4 networking protocol, may receive IPv4 addresses relatively quickly, such that logical link 20A may transition to an "active" or "up" state. In contrast, interfaces of network devices 16A, 16B for logical link 20B, which operates in accordance with the IPv6 networking protocol, may not obtain IPv6 addresses from a DHCP server due to a delay inserted into the address allocation process to ensure that there are no duplicate addresses assigned within the same network. For example, this delay may be 9 seconds or more while a duplicate address detection (DAD) operation for the logical link 20B resolves.

Adjacency state machine 80, as described herein, may ensure that interfaces of network devices 16A, 16B for both logical link 20A and logical link 20B are assigned addresses prior to indicating that router 16A and router 16B are adjacent to one another, instead of relying only on the assignment of addresses for the interfaces of logical link 20A (operating in accordance with IPv4) to indicate an adjacency between router 16A and router 16B. In this fashion, the adjacency state machine described herein may avoid forwarding traffic in accordance with the second networking protocol along logical link 20B where the interfaces of network devices 16A, 16B of logical link 20B have not yet received addresses, thereby reducing traffic blackholing of the traffic in accordance with the second networking protocol.

Figure 2:
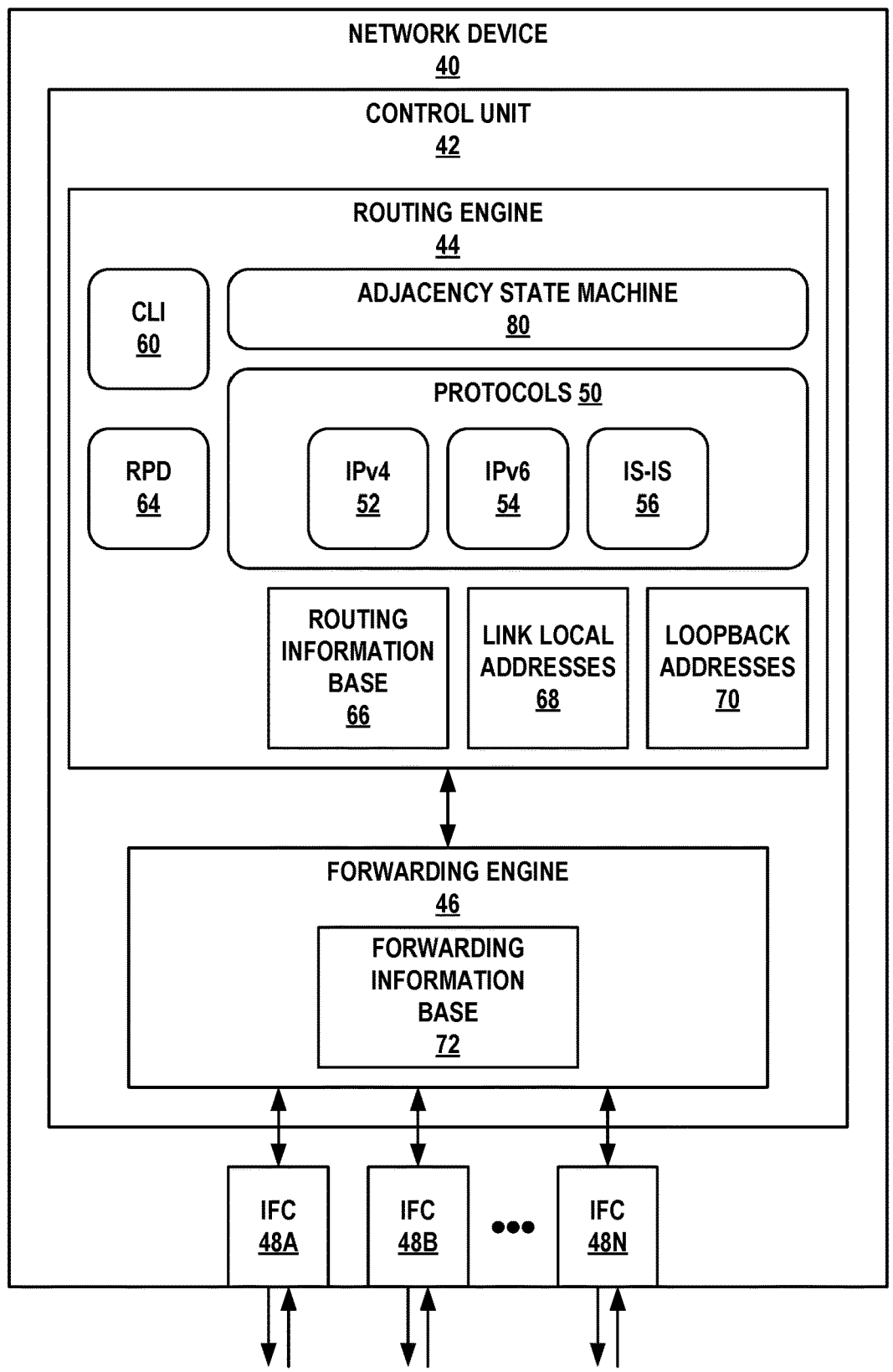
FIG. 2 is a block diagram illustrating an example network device configured to implement a link state routing protocol adjacency state machine in accordance with the techniques of this disclosure.

FIG. 2 is a block diagram illustrating an example network device 40 configured to implement link state routing protocol adjacency state machine 80 in accordance with the techniques of this disclosure. Network device 40 may operate as any routers 16 of network 10 of FIG. 1.

In the illustrated example of FIG. 2, network device 40 includes a control unit 42 with a routing engine 44 that provides control plane functionality for the network device and a forwarding engine 46 that provides forwarding or data plane functionality for the network device to send and receive traffic by a set of interface cards 48A-48N (collectively, "IFCs 48") that typically have one or more physical network interface ports. Forwarding engine 46 performs packet switching and forwarding of incoming data packets for transmission over a network.

As shown in FIG. 2, forwarding engine 46 includes forwarding information base (FIB) 72 that stores forwarding data structures associating network destinations with next hops and outgoing interfaces. Although not shown in FIG. 2, forwarding engine 46 may comprise a central processing unit (CPU), memory and one or more programmable packet-forwarding application-specific integrated circuits (ASICs).

Routing engine 44 includes various protocols 50 that perform routing functions for network device 40. In the illustrated example of FIG. 2, protocols 50 include IPv4 52, IPv6 54, and IS-IS 56 as routing protocols used to exchange routing information with other network devices in a network, in order to discover the network topology and update routing information base (RIB) 66. For example, control unit 42 may use IS-IS 56, or other types routing protocols such as BGP, EBGP, or IBGP, to configure routing sessions between network device 40 and the other network devices in the network.

RIB 66 may describe the topology of the network in which network device 40 resides, and may also describe various routes within the network and the appropriate next hops for each route, i.e., the neighboring routing devices along each of the routes. Routing engine 44 analyzes the information stored in RIB 66 to generate FIB 72. Routing engine 44 installs forwarding data structures into FIB 72 within forwarding engine 46. FIB 72 associates network destinations with specific next hops and corresponding interface ports within the data plane.

In the example of FIG. 2, routing engine 44 includes a command line interface (CLI) 60 that provides access for an administrator (not shown) to monitor, configure, or otherwise manage network device 40. In addition, routing engine 44 includes a routing protocol daemon (RPD) 64 as a user-level process that executes the routing protocols to communicate with peer routers or switches, maintain and update one or more routing tables in routing engine 44, and create one or more forwarding tables for installation in forwarding engine 46, among other functions.

IPv4 52 and IPv6 54 are enabled on all the physical network interface ports of IFCs 48 of network device 40. For example, an IPv4 link local address is assigned to one or more of the physical interface ports of IFCs 48. Further, an IPv6 link local address is assigned to one or more of the physical interface ports of IFCs 48. In some examples, neighbor discovery is enabled on network device 40. For example, network device 40 may perform IS-IS neighbor discovery to discover one or more neighbors that operate in accordance with the IPv4 networking protocol and one or more neighbors that operate in accordance with the IPv6 networking protocol.

Routing engine 44 may also configure a loopback address for network device 40 for each enabled networking protocol (e.g., IPv4 and/or IPv6). The loopback addresses for network device 40 may be chosen from an IP address range that is allocated to a sub-network in which network device 40 resides.

Routing engine 44 further includes link state routing protocol adjacency state machine 80. Adjacency state machine 80 operates to determine other network devices that are adjacent to network device 40 so as to build a graph or other data structure in a manner that reflects the topology of the network from the perspective of network device 40. Routing engine 44 may use the adjacency information generated by adjacency state machine 80 as a basis for implementing a path selection algorithm to determine paths through the network for data packets forwarded by forwarding engine 46.

Adjacency state machine 80 identifies a network device that is adjacent to network device 40 by determining whether one or more logical links have been established across a physical link to the network device. A logical link is considered to be established between network device 40 and a neighboring device and available for transporting network traffic when an interface of network device 40 is assigned an address according to a network protocol for the logical link, an interface of the neighboring device is assigned an address according to the network protocol for the logical link, and network device 40 and the neighboring device have exchanged hello messages. The hello messages serve to inform a recipient device of an interface address of the sending device. In some examples, the hello messages are IS-IS Hello (IIH) PDUs.

A logical link may have three adjacency states: Down, Initializing, and Up. "Down" (also referred to herein as "inactive") is the initial state and indicates that no hello messages have been received from the neighboring device. "Initializing" indicates that network device 40 has successfully received a "hello" message from the neighboring device, but is unsure whether the neighboring device has also successfully received a "hello" message from network device 40. "Up" (also referred to herein as "active") indicates that network device 40 has confirmed that the neighboring device is receiving "hello" messages from network device 40. Additional information regarding the implementation of an IS-IS adjacency state machine is described in ISO 10589 and in RFC 1195, referenced above, and in D. Katz, "Three-Way Handshake for IS-IS Point-to-Point Adjacencies," RFC 5303 (October 2008), available at https://tools.ietf.org/html/rfc5303, the entire content of each of which is incorporated by reference herein.

Typically, network device 40 may exchange hello messages with neighboring devices, such as routers 16 of FIG. 1, about every 10 seconds. Once network device 40 discovers a neighboring device and an adjacency is formed, network device 40 may use hello messages as "keepalive" messages to maintain the adjacency and inform changes in the adjacency parameters. As an example of a hello message, an IIH PDU may include, e.g., a system ID of the network device originating the IIH message, a priority for designated forwarder (DF) election, a LAN ID, and/or a local circuit ID. Where network device 40 is configured as an IS-IS Layer-1 device, network device 40 sends only Layer-1 IIH PDUs over IFCs 48. Where network device 40 is configured as an IS-IS Layer-1/Layer-2 device, network device 40 sends Layer-1 IIH PDUs and Layer-2 IIH PDUs over IFCs 48.

As described above, network device 40 implements both IPv4 and IPv6 networking protocols such that one or more IFCs 48 are assigned an IPv4 address and one or more IFCs 48 are assigned an IPv6 address. Network device 40 may be connected via a physical link to a neighboring device. The physical link may terminate at one or more of IFCs 48 of network device 40. Network device 40 establishes a first logical link over the physical link according to a first networking protocol. For example, an IPv4 address is assigned to IFC 48A of network device 40, and network device 40 floods IPv4 IIH PDUs via IFC 48A. Upon receiving IPv4 IIH PDUs via IFC 48A from a neighboring device, network device 40 establishes a first logical link according to IPv4 over IFC 48A with the neighboring device.

Furthermore, network device 40 establishes a second logical link over the physical link according to a second networking protocol. For example, an IPv6 address is assigned to IFC 48B of network device 40, and network device 40 floods IPv6 IIH PDUs via IFC 48B. Upon receiving IPv6 IIH PDUs via IFC 48B from the neighboring device, network device 40 establishes a second logical link according to IPv6 over IFC 48B with the neighboring device.

An adjacency state machine that does not use the techniques of the disclosure may indicate that the neighboring device is adjacent to network device 40 in response to determining only that the first logical link over IFC 48A is "Up" or "Active," even where second logical link over IFC 48B is still in an "Initializing" state. For example, where IFC 48A establishes the first logical link in accordance with the IPv4 networking protocol, IFC 48A may be assigned an IPv4 address relatively quickly, such that the first logical link may transition to an "active" or "up" state. In contrast, where IFC 48B establishes the second logical link in accordance with the IPv6 networking protocol, a DHCP server may not assign an address to IFC 48B for a period of time wherein a DAD operation for the second logical link resolves.

An adjacency state machine that does not use the techniques of the disclosure may use only the first logical link between network device 40 and the neighboring device to determine that network device 40 and the neighboring device are adjacent. This may cause routing engine 44 to use the second logical link between network device 40 and the neighboring device to be used in SPF calculations for forwarding network traffic according to the second networking protocol, which may lead to traffic loss or blackholing if traffic is forwarded along the second logical link between network device 40 and the neighboring device while the second logical link is not yet "active."

In accordance with the techniques of the disclosure, adjacency state machine 80 ensures that each of the logical links established on a physical link between network device 40 and a neighboring network device are in an "active" state prior to indicating that network device 40 and the neighboring device are adjacent to one another. For example, a first logical link according to a first networking protocol and a second logical link according to a second networking protocol are established between network device 40 and a neighboring device. In one example, the first networking protocol is IPv4 and the second networking protocol is IPv6.

To determine whether the first logical link is in an "active" state, adjacency state machine 80 determines whether network device 40 has output one or more IPv4 IIH PDUs via IFCs 48 for the first logical link and whether the neighboring device has output one or more IPv4 IIH PDUs for the first logical link. In some examples, the IPv4 IIH PDUs comprise a type-length value (TLV) specifying a capability of the respective network device 40 and the neighboring device to operate according to the first networking protocol (e.g., both network device 40 and the neighboring device are compatible with the IPv4 networking protocol). By ensuring that both network device 40 and the neighboring device have output IIH PDUs for the first logical link, adjacency state machine 80 may ensure that an IPv4 address has been assigned to an IFC 48 of network device 40 and to an interface of the neighboring device. Thereby, adjacency state machine 80 may determine that the first logical link is in an "active" state.

Furthermore, to determine whether the second logical link is established, adjacency state machine 80 determines whether network device 40 has output one or more IPv6 IIH PDUs via IFCs 48 for the second logical link and whether the neighboring device has output one or more IPv6 IIH PDUs for the second logical link. In some examples, the IPv6 IIH PDUs comprise a TLV specifying a capability of the respective network device 40 and the neighboring device to operate according to the second networking protocol (e.g., both network device 40 and the neighboring device are compatible with the IPv6 networking protocol). By ensuring that both network device 40 and the neighboring device have output IIH PDUs for the second logical link, adjacency state machine 80 may ensure that an IPv6 address has been assigned to an IFC 48 of network device 40 and to an interface of the neighboring device. Thereby, adjacency state machine 80 may determine that the second logical link is in an "active" state.

In some examples, adjacency state machine 80 determines that the second logical link is active upon expiration of a predetermined amount of time. The predetermined amount of time may correspond to a time required for an address allocation process to resolve for the one or more IFCs 48 of network device 40 and the interfaces of the neighboring network device. For example, where the second logical link operates in accordance with the IPv6 networking protocol, the predetermined amount of time may correspond to an amount of time required for a DHCP server to perform a duplicate address detection (DAD) operation to ensure that there are no duplicate addresses assigned within the same network. In some examples, adjacency state machine 80 determines that the second logical link is active based on a determination of one or more of a combination of: 1) internetwork device 40 has output an IIH PDU for the second logical link; 2) the neighboring device 40 has output an IIH PDU for the second logical link; or 3) the predetermined amount of time has elapsed. The use of the predetermined amount of time may provide sufficient time for DAD operations for the second logical link to resolve or time-out, thereby ensuring that the second logical link is in the "active" state prior to indicating that network device 40 and the neighboring device are adjacent. In some examples, adjacency state machine 80 may output, for display to a user, a notification comprising the predetermined amount of time.

In response to determining that both the first logical link is in an "active" state and the second logical link is in an "active" state, adjacency state machine 80 determines that the neighboring device is adjacent to network device 40. For example, adjacency state machine 80 ensures that addresses are assigned to interfaces of both network device 40 and the neighboring device for both logical links by ensuring that both network device 40 and the neighboring device have output hello messages to one another for both logical links. For example, adjacency state machine 80 determines that both network device 40 and the neighboring device have each output IPv4 IIH PDUs and IPv6 IIH PDUs prior to indicating that that network device 40 and the other router 16 are adjacent to one another.

Adjacency state machine 80 outputs an indication that the neighboring device is adjacent to network device 40. In response to the indication that network device 40 and the neighboring device are adjacent to one another, routing engine 44 may flood, via IFCs 48, a first link state advertisement advertising the first logical link between network device 40 and the neighboring device and a second link state advertisement advertising the second logical link between network device 40 and the neighboring device. In some examples, the first link state advertisement advertises an IPv4 logical link between network device 40 and the neighboring device and the second link state advertisement advertises an IPv6 logical link between network device 40 and the neighboring device. Furthermore, routing engine 44 adds, to RIB 66, the first logical link according to the first networking protocol and the second logical link according to the second networking protocol. After adding the first and second logical links to RIB 66, routing engine 44 may update, based on RIB 66, a path selection for forwarding of network traffic serviced by network device 40. After updating the path selection for forwarding of the network traffic serviced by network device 40, routing engine 44 may resolve RIB 66 to provision a path for forwarding of the network traffic serviced by network device 40. In this fashion, adjacency state machine 80, as described herein, may allow network device 40 to avoid forwarding traffic according to the second networking protocol along the second logical link where the second logical link is not yet capable of transporting traffic. Therefore, an adjacency state machine as described herein may reduce the occurrence of traffic blackholing, such as may occur for IPv6 network traffic in a dual-stack IS-IS network where a physical link between two network devices is disabled and re-enabled or undergoes link "flapping."

Figure 3A:
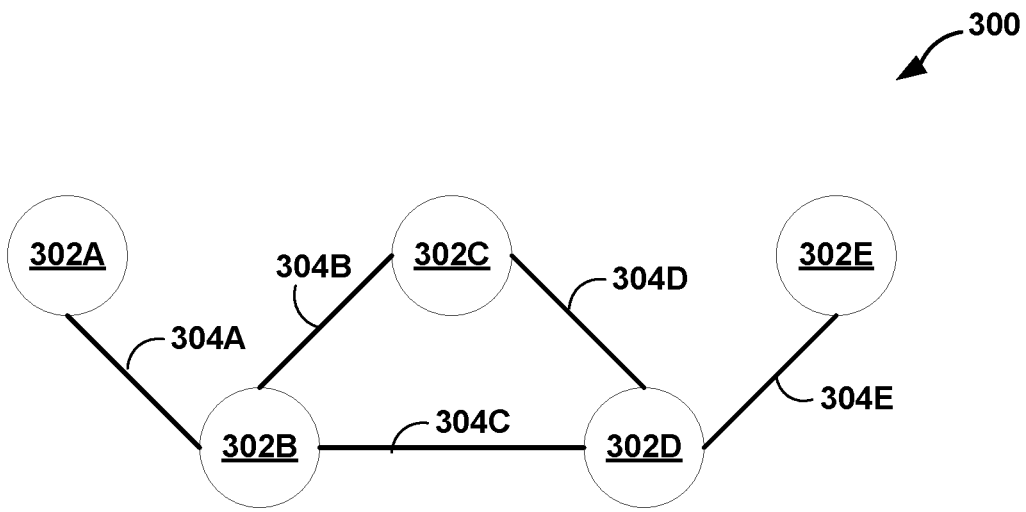
FIGS. 3A-3B depict an example IS-IS network 300 upon which the techniques of the disclosure may be implemented.
Figure 3B:
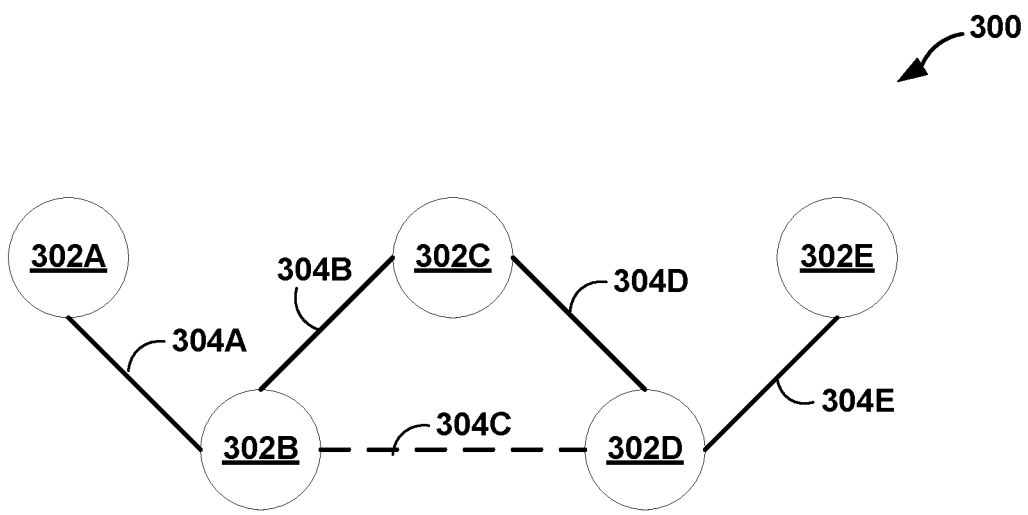

FIGS. 3A-3B depict an example IS-IS network 300 upon which the techniques of the disclosure may be implemented. IS-IS network 300 includes network devices 302A-302E (hereinafter, "network devices 302"). Network devices 302 may be, e.g., examples of routers 16 of FIG. 1 or of network device 40 of FIG. 2.

IS-IS was designed as a Connectionless Network Service (CLNS) link state routing protocol for use with the International Organization for Standardization (ISO) address family. IS-IS was later enhanced to support Dual-stack IS-IS for IPv4 and IPv6 networking protocols. An adjacency state machine for IS-IS may depend only on the ISO address family on a physical link. With the introduction of dual-stack IS-IS, most adjacency state machines require that, if a logical interface advertises an IPv4 interface address, there should be at least one matching IPv4 subnet advertised by both interfaces of the logical link for the adjacency to be up.

IS-IS can support dual-stack IS-IS in two ways. First, IS-IS supports a default unicast topology. In the default unicast topology, all physical links can support logical links established in accordance with either IPv4 or IPv6 networking protocols. An IS-IS adjacency state machine not implementing the techniques of the disclosure typically performs a single Shortest Path First (SPF) operation and uses the same shortest-path for routing network traffic according to both IPv4 and IPv6 networking protocols, irrespective of whether all the network devices in the path support both IPv4 and IPv6 networking protocols or whether the logical links established according to IPv6 are in an "active" state. The default unicast topology is commonly used if all logical links in the network support both IPv4 and IPv6.

Second, IS-IS supports MT IS-IS. In MT IS-IS, network devices advertise IPv4 and IPv6 capabilities separately such that all of the network devices have multiple views of the network based on the protocols supported by respective logical links. An MT IS-IS adjacency state machine performs separate SPF operations for both IPv4 and IPv6 networking protocols. This means that IPv4 routes follow paths that support the IPv4 networking protocol and IPv6 routes follow paths that support the IPv6 networking protocol, and the IPv4 routes are not necessarily the same as the IPv6 routes.

In networks where both IPv4 and IPv6 networking protocols are enabled on all network devices, customers are most likely not willing to deploy MT IS-IS. For example, the use of MT IS-IS increases the administrative burden of a network because MT IS-IS implements a separate network topology for IPv4 and IPv6 networking protocols, thereby increasing the number of network topologies that an administrator must configure, maintain, and upgrade a network. However, without the use of MT IS-IS, during link flapping, it is possible that for the same physical link, both an address for an interface according to a first networking protocol and an address for the interface according to a first networking protocol may not be assigned at the same time. This is very likely where an IPv4 address may be assigned to an interface quickly, while an assignment of an IPv6 address for the interface may be delayed while a DAD operation resolves. For example, when assigning an IPv6 address to an interface, typical DAD implementations hold the IPv6 address in an "initializing" state (wherein the traffic may not be forwarded on the interface) until DAD detection is completed. The DAD operation may take 9 or more seconds to complete. In such a deployment, when a new physical link or a redundant physical link with a better cost metric is added (or flaps), an IPv4 address for interfaces of an IPv4 logical link established on the physical link may be assigned immediately. An adjacency state machine not using the techniques of the disclosure may determine an adjacency between two network devices of the new physical link as soon as the IPv4 addresses are assigned. However, if an IPv6 logical link is also established on the physical link, IPv6 addresses assigned to the interfaces of the two network devices may not yet be up pending DAD resolution. SPF computation may use the IPv4 adjacency to choose the new physical link (or flapped link) as the shorter path for both IPv4 and IPv6 network traffic, even though the IPv6 addresses are still in an "initializing" state. This may cause traffic blackholing of IPv6 network traffic forward along the IPv6 logical link until the IPv6 addresses are assigned to the interfaces of the network devices of the new link.

FIG. 3A depicts example IS-IS network 300 comprising a plurality of network devices 302A-302E (hereinafter, "network devices 302") connected via a plurality of physical links 304A-304E (hereinafter, "physical links 302"). In the example of FIG. 3A, consider the scenario where all links 304 have an equal cost metric. The shortest path from network device 302A to network device 302E will be: 1) from network device 302A to network device 302B via physical link 304A; 2) from network device 302B to network device 302D via physical link 304C; and 3) from network device 302D to network device 302E via physical link 304E.

In FIG. 3B, physical link 304C between network device 302B and network device 302D is disabled (as depicted by the dashed line of physical link 304C). FIG. 3B depicts the topology post-convergence. The shortest path from 302A to 302E would now be: 1) from network device 302A to network device 302B via physical link 304A; 2) from network device 302B to network device 302C via physical link 304B; 3) from network device 302C to network device 302D via physical link 304D; and 4) from network device 302D to network device 302E via physical link 304E.

After a while, physical link 304C between network devices 302B and 302D is restored. IPv4 addresses for the IPv4 interfaces of network devices 302B and 302D are assigned immediately to establish an IPv4 logical link over physical link 304C, and, because of the matching IPv4 addresses between network devices 302B and 302D, an adjacency state machine not implementing the techniques of the disclosure may determine that network devices 302B and 302D are adjacent. However, IPv6 addresses for the IPv6 interfaces of network devices 302B and 302D may still be in an initializing state while DAD operations for the IPv6 interfaces resolve. SPF computation may select link 304C between network devices 302B and 302D as the shortest path to network device 302E, and network device 302B may switches all routes to use physical link 304C between network devices 302B and 302D as the primary nexthop to network device 302E. This may occur even though the IPv6 logical link between network devices 302B and 302D is not active because the IPv6 addresses for the IPv6 interfaces of network devices 302B and 302D are still not up. This scenario leads to loss of IPv6 network traffic forwarded to the IPv6 logical link established over physical link 304C, even though there is an active redundant path (e.g., from network 302B→302C→302D) available.

The above IPv6 traffic loss problem could be prevented through the use of MT IS-IS. However, where customers already have both IPv4 and IPv6 on all links, MT IS-IS is cumbersome, expensive, and difficult to implement just to solve this issue. Furthermore, from a customer perspective, traffic drop is unintuitive and undesired where a redundant path to network device 302D (e.g., from network device 302B to network device 302C via physical link 304B and from network device 302C to network device 302D via physical link 304D) is already available.

In accordance with the techniques of the disclosure, each of network devices 302 implements a link state routing protocol adjacency state machine as described herein. In some examples, the link state routing protocol adjacency state machine is a modified IS-IS adjacency state machine. The adjacency state machine serves to prevent traffic drop when a new, redundant physical link becomes available. The adjacency state machine waits for both network devices 302 of a physical link to output hello messages in accordance with a first networking protocol and hello messages in accordance with a second networking protocol to one another before determining that the two network devices 302 are adjacent to one another. In some examples, the first networking protocol is the IPv4 networking protocol and the second networking protocol is the IPv6 networking protocol.

In some examples, the adjacency state machine may be adjusted via a configuration knob to toggle between: 1) waiting for IIH hello messages from only IPv4 interfaces of both network devices 302 before determining that the two network devices 302 are adjacent to one another; and 2) waiting for IIH hello messages from both the IPv4 interfaces and the IPv6 interfaces of both network devices 302 before determining that the two network devices 302 are adjacent to one another.

In one example, physical link 304C is to be brought up between network device 302B and neighboring network device 302D. An adjacency state machine of network device 302B determines whether both network device 302B and network device 302D support both IPv4 and IPv6 networking protocols. In some examples, the adjacency state machine determines the networking protocols supported by a network device 302 by examining the Protocols Supported TLV (TLV 129) of an IIH message output by the network device 302.

If both network device 302B and network device 302D support both IPv4 and IPv6 networking protocols, the adjacency state machine waits for either of: 1) a predetermined amount of time; or 2) until each of network devices 302 advertises an IPv4 link address (TLV 132) and an IPv6 link address (TLV 232) in an IIH PDU. Upon the satisfaction of either (1) or (2) above, the adjacency state machine determines that network device 302B and network device 302D are adjacent to one another. In some examples, the predetermined amount of time (e.g., a STRICT ADJACENCY WAIT value in seconds), is associated with an IPv6 DAD retry timer implementation to ensure that the adjacency state machine waits for DAD operations to complete before determining that network device 302B and network device 302D are adjacent to one another. The use of the predetermined amount of time allows the adjacency state machine to determine that at least one logical link established over physical link 304C is active even if addresses are not assigned to the interfaces of all of the logical links. For example, the adjacency state machine may determine that network device 302B and network device 302D are adjacent to one another via an IPv4 logical link established over physical link 304C, even if an IPv6 logical link established over physical link 304C fails to resolve.

In some examples, the techniques of the disclosure may be implemented only a single one of the two nodes that form physical link 304C (e.g., one of network device 302B and network device 302D). This is because bidirectionality checks in SPF prevent either of network devices 302B and 302D from picking a new physical link for shortest path computation until both network device 302B determines that network device 302D is adjacent and network device 302D determines that network device 302B. This may act to prevent selecting a physical link where traffic is capable of flowing only unidirectionally. Furthermore, the adjacency state machine described herein does not introduce routing loops of any sorts into routing path computation.

In some examples, the adjacency state machine outputs a notification to a user specifying the wait period. In some examples, the adjacency state machine outputs a notification to a user indicating that an adjacency between two network devices 302 is in an "initializing" state because the strict adjacency checks described herein are still in process. In some examples, the notifications are syslog messages or other display command outputs. In some examples, the notifications are configurable as a debuggability enhancement.

Accordingly, the techniques of the disclosure may prevent possible dropping of IPv6 network traffic during adjacency checks for physical links in a dual-stack IS-IS network running a default unicast topology (e.g., where MT IS-IS is not used). Furthermore, the techniques of the disclosure describe an adjacency state machine that may implement a timer-based, stricter adjacency state machine that avoids the need to deploy MT IS-IS in a network where all physical links support both IPv4 and IPv6 networking protocols. The adjacency state machine described herein may be easily implemented into existing networks and does not require additional extensions to existing link state routing protocols or networking protocols. Furthermore, the adjacency state machine may solve such commonly-reported instances of traffic drop during topology change in dual-stack IS-IS networks.

Figure 4:
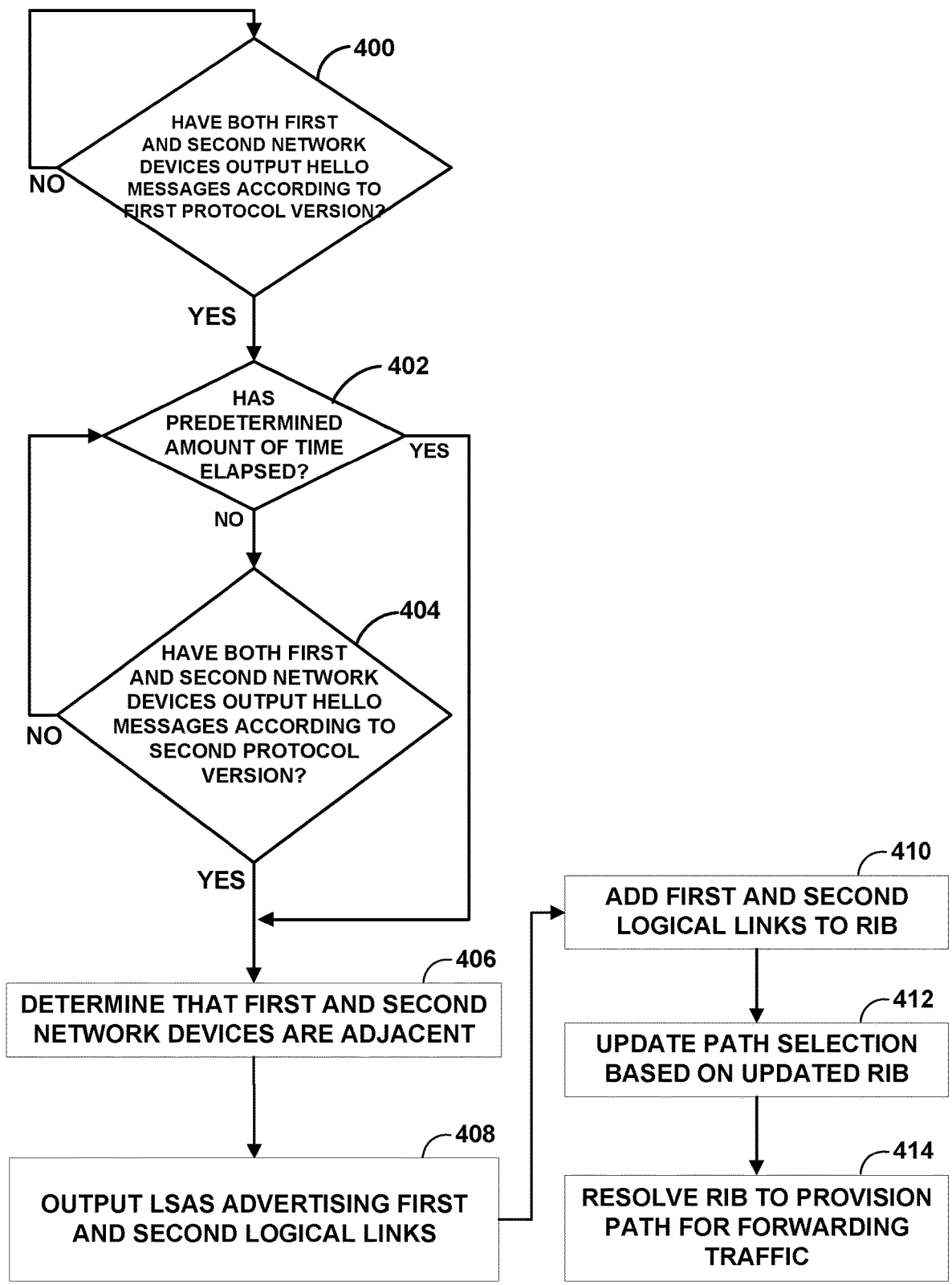
FIG. 4 depicts an operation in accordance with the techniques of the disclosure.

FIG. 4 depicts an operation in accordance with the techniques of the disclosure. For convenience, FIG. 4 is described with respect to FIG. 1. Specifically, FIG. 4 depicts an operation for updating a path selection metric for forwarding of traffic serviced by router 16A (e.g., a first network device) to router 16B (e.g., a second network device) based on a determination that router 16A and router 16B are adjacent to one another via physical link 22. For example, adjacency state machine 80 of router 16A ensures that both first logical link 20A between router 16A and router 16B according to a first networking protocol and a second logical link 20B between router 16A and router 16B according to a second networking protocol are in an "active" state prior to determining that router 16A and router 16B are adjacent to one another. In some examples, adjacency state machine 80 is a modified IS-IS adjacency state machine in dual-stack IS-IS network 10 running a default unicast topology.

As depicted in the example of FIG. 4, adjacency state machine 80 of router 16A determines whether first logical link 20A according to the first networking protocol between router 16A and router 16B is active. In some examples, first logical link 20A is established over physical link 22 and operates in accordance with the IPv4 routing protocol.

In one example, adjacency state machine 80 of router 16A determines whether first logical link 20A is in an "active" state by determining whether both router 16A has output, to router 16B, a first hello message according to the first networking protocol and router 16B has output, to router 16A, a second hello message according to the first networking protocol (400). In some examples, the first and second hello messages are IPv4 IIH PDUs. In some examples, the first and second hello messages comprise a TLV specifying a capability of the respective router 16A and router 16B to operate according to the first networking protocol. For example, the TLV may specific that the corresponding router 16 is compatible with the IPv4 networking protocol. By waiting until both routers 16A and 16B have output the first and second hello messages according to the first networking protocol, adjacency state machine 80 of router 16A may ensure that addresses according to the first networking protocol have been assigned to interfaces of both routers 16A and 16B for first logical link 20A.

In response to determining that both router 16A and router 16B have not yet output the respective first and second hello messages according to the first networking protocol (e.g., "NO" path of block 400), adjacency state machine 80 of router 16A may continue monitoring to determine whether the first and second hello messages have been output. In some examples, if the first and second hello messages have not been output within a predetermined amount of time, adjacency state machine 80 may determine that router 16A and router 16B are not adjacent to one another.

In response to determining that both router 16A and router 16B have output the respective first and second hello messages according to the first networking protocol (e.g., "YES" path of block 400), adjacency state machine 80 of router 16A determines whether a predetermined amount of time has elapsed (402). In an example where the second networking protocol is the IPv6 networking protocol, the predetermined amount of time is similar to a length of time required for a DAD operation to resolve for the addresses assigned to the interfaces of routers 16A and 16B supporting second logical link 20B. The use of the predetermined amount of time may provide sufficient time for DAD operations for the IPv6 interfaces to resolve, thereby ensuring that second logical link 20B is in the "active" state prior to indicating that routers 16A and 16B are adjacent to one another. Furthermore, the expiration of the predetermined amount of time may allow adjacency state machine 80 to determine that routers 16A and 16B are adjacent to one another via first logical link 20A, operating in accordance with the IPv4 protocol, even if second logical link 20B, operating in accordance with the IPv6 protocol, fails to be established. In some examples, adjacency state machine 80 of router 16A outputs, for display to a user, a notification comprising the predetermined amount of time.

In response to determining that the predetermined amount of time has not elapsed (e.g., "NO" path of block 402), adjacency state machine 80 of router 16A determines whether second logical link 20A is in an "active" state by determining whether both router 16A has output, to router 16B, a third hello message according to the second networking protocol and router 16B has output, to router 16A, a fourth hello message according to the second networking protocol (404). In some examples, the third and fourth hello messages are IPv6 IIH PDUs. In some examples, the third and fourth hello messages comprise a TLV specifying a capability of the respective router 16A and router 16B to operate according to the second networking protocol. For example, the TLV may specific that the corresponding router 16 is compatible with the IPv6 networking protocol. By waiting until both routers 16A and 16B have output the third and fourth hello messages according to the second networking protocol, adjacency state machine 80 of router 16A may ensure that addresses according to the second networking protocol have been assigned to interfaces of both routers 16A and 16B for second logical link 20A.

In response to determining that both router 16A and router 16B have output the respective third and fourth hello messages according to the second networking protocol (e.g., "YES" path of block 404), or in response to determining that the predetermined amount of time has elapsed (e.g., "YES" path of block 402), adjacency state machine 80 of router 16A determines that router 16A and router 16B are adjacent to one another (406). Thus, adjacency state machine 80 determines that both first logical link 20A between routers 16A and 16B is active and second logical link 20B between routers 16A and 16B is active prior to determining that routers 16A and 16B are adjacent to one another. In response to determining that routers 16A and 16B are adjacent to one another, router 16A may output a first link state advertisement notifying other routers 16 of the adjacency between routers 16A and 16B via first logical link 20A and a second link state advertisement notifying other routers 16 of the adjacency between routers 16A and 16B via second logical link 20B (408).

In response to the determination that router 16A and router 16B are adjacent to one another, router 16A adds, to a RIB of router 16A, first logical link 20A operating in accordance with the first networking protocol and second logical link 20B operating in accordance with the second networking protocol (410). After adding first and second logical links 20A, 20B to the RIB of router 16A, router 16A updates, based on the updated RIB of router 16A, a path selection for forwarding of network traffic serviced by router 16A (412).

After updating the path selection for forwarding of the network traffic serviced by router 16A, router 16A resolves the RIB of router 16A to provision a path for forwarding of the network traffic serviced by router 16A (414). In this fashion, adjacency state machine 80 of router 16A, as described herein, may allow router 16A to avoid forwarding traffic according to the second networking protocol over second logical link 20B where addresses have not yet been assigned to interfaces of network devices 16A and 16B that support second logical link 20B. Therefore, an adjacency state machine as described herein may reduce the occurrence of traffic blackholing, particular as observed for IPv6 network traffic in a dual-stack IS-IS network where a physical link between two network devices is disabled and re-enabled or during link "flapping."

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    determining, by a link state routing protocol adjacency state machine executed by processing circuitry of a first network device of a plurality of network devices in a network operating in accordance with a link state routing protocol, that a first logical link according to a first networking protocol is active, wherein the first logical link is established on a first physical link between the first network device and a second network device of the plurality of network devices;
    determining, by the link state routing protocol adjacency state machine, that a second logical link according to a second networking protocol is active, wherein the second logical link is established on the first physical link between the first network device and the second network device, and wherein the first networking protocol and second networking protocol are different; and
    in response to determining that the first logical link is active and determining that the second logical link is active:
        outputting, by the processing circuitry, a first link state routing advertisement advertising the first logical link; and
        outputting, by the processing circuitry, a second link state routing advertisement advertising the second logical link.

2. The method of claim 1,
    wherein the link state routing protocol adjacency state machine is an Intermediate System to Intermediate System (IS-IS) link state routing protocol adjacency state machine, and
    wherein the network operating in accordance with the link state routing protocol comprises a dual-stack IS-IS network.

3. The method of claim 1,
    wherein the first networking protocol is Internet Protocol version 4 (IPv4), and
    wherein the second networking protocol is Internet Protocol version 6 (IPv6).

4. The method of claim 1,
    wherein determining that the first logical link according to the first networking protocol is active comprises:
        determining, by the link state routing protocol adjacency state machine, that the first network device has output a first hello message according to the first networking protocol to discover the second network device;
        determining, by the link state routing protocol adjacency state machine, that the second network device has output a second hello message according to the first networking protocol to discover the first network device; and
        determining, by the link state routing protocol adjacency state machine and based on the determination that the first network device has output the first hello message and the determination that the second network device has output the second hello message, that the first logical link according to the first networking protocol is active, and
    wherein determining that the second logical link according to the second networking protocol is active comprises:
        determining, by the link state routing protocol adjacency state machine, that the first network device has output a third hello message according to the second networking protocol to discover the second network device;
        determining, by the link state routing protocol adjacency state machine, that the second network device has output a fourth hello message according to the second networking protocol to discover the first network device; and
        determining, by the link state routing protocol adjacency state machine and based on the determination that the first network device has output the third hello message and the determination that the second network device has output the fourth hello message, that the second logical link according to the second networking protocol is active.

5. The method of claim 4,
    wherein the first and second hello messages are Internet Protocol version 4 (IPv4) Intermediate System to Intermediate System (IS-IS) Hello (IIH) Protocol Data Units (PDUs), and
    wherein the third and fourth hello messages are Internet Protocol version 6 (IPv6) IIH PDUs.

6. The method of claim 4,
    wherein the first and second hello messages comprise a type-length value (TLV) specifying a capability of the respective first and second network devices to operate according to the first networking protocol, and
    wherein the third and fourth hello messages comprise a TLV specifying a capability of the respective first and second network devices to operate according to the second networking protocol.

7. The method of claim 4, wherein determining that the second logical link according to the second networking protocol is active further comprises:
    determining, by the link state routing protocol adjacency state machine, that a predetermined amount of time has elapsed; and
    determining, by the link state routing protocol adjacency state machine and based on: 1) the determination that the first network device has output the third hello message; 2) the determination that the second network device has output the fourth hello message; and 3) the determination that the predetermined amount of time has elapsed, that the second logical link according to the second networking protocol is active.

8. The method of claim 7, wherein the predetermined amount of time is a length of time of a duplicate address detection (DAD) operation for the second logical link according to the second networking protocol.

9. The method of claim 7, further comprising outputting, by the link state routing protocol adjacency state machine and for display, a notification comprising the predetermined amount of time.

10. The method of claim 1, further comprising:
    in response to determining that the first logical link is active and determining that the second logical link is active, adding, by the processing circuitry and to a routing information base (RIB) of the first network device, the first logical link and the second logical link.

11. The method of claim 10, further comprising:
after adding the first logical link and the second logical link to the RIB of the first network device, resolving, by the processing circuitry, the RIB of the first network device, to obtain forwarding information; and
installing the forwarding information in a forwarding plane of the first network device to provision a path for forwarding the network traffic serviced by the first network device.

12. A first network device of a plurality of network devices in a network operating in accordance with a link state routing protocol, the first network device comprising processing circuitry configured to:
execute a link state routing protocol adjacency state machine configured to:
determine that a first logical link according to a first networking protocol is active, wherein the first logical link is established on a first physical link between the first network device and a second network device of the plurality of network devices; and
determine that a second logical link according to a second networking protocol is active, wherein the second logical link is established on the first physical link between the first network device and the second network device, and wherein the first networking protocol and second networking protocol are different,
wherein, in response to determining that the first logical link is active and determining that the second logical link is active, the processing circuitry is further configured to:
output a first link state routing advertisement advertising the first logical link; and
output a second link state routing advertisement advertising the second logical link.

13. The first network device of claim 12,
wherein the link state routing protocol adjacency state machine is an Intermediate System to Intermediate System (IS-IS) adjacency state machine, and
wherein the network operating in accordance with the link state routing protocol comprises a dual-stack IS-IS network.

14. The first network device of claim 13, wherein, in response to determining that the first logical link is active and determining that the second logical link is active, the processing circuitry is further configured to add, to a routing information base (RIB) of the first network device, the first logical link and the second logical link.

15. The first network device of claim 12,
wherein the first networking protocol is Internet Protocol version 4 (IPv4), and
wherein the second networking protocol is Internet Protocol version 6 (IPv6).

16. The first network device of claim 12,
wherein to determine that the first logical link according to the first networking protocol is active, the link state routing protocol adjacency state machine is further configured to:
determine that the first network device has output a first hello message according to the first networking protocol to discover the second network device;
determine that the second network device has output a second hello message according to the first networking protocol to discover the first network device; and
determine, based on the determination that the first network device has output the first hello message and the determination that the second network device has output the second hello message, that the first logical link according to the first networking protocol is active, and
wherein to determine that the second logical link according to the second networking protocol is active, the link state routing protocol adjacency state machine is further configured to:
determine that the first network device has output a third hello message according to the second networking protocol to discover the second network device;
determine that the second network device has output a fourth hello message according to the second networking protocol to discover the first network device; and
determine, based on the determination that the first network device has output the third hello message and the determination that the second network device has output the fourth hello message, that the second logical link according to the second networking protocol is active.

17. The first network device of claim 16,
wherein the first and second hello messages are Internet Protocol version 4 (IPv4) Intermediate System to Intermediate System (IS-IS) Hello (IIH) Protocol Data Units (PDUs), and
wherein the third and fourth hello messages are Internet Protocol version 6 (IPv6) IIH PDUs.

18. The first network device of claim 16, wherein to determine that the second logical link according to the second networking protocol is active, the link state routing protocol adjacency state machine is further configured to:
determine that a predetermined amount of time has elapsed; and
determine, based on: 1) the determination that the first network device has output the third hello message; 2) the determination that the second network device has output the fourth hello message; and 3) the determination that the predetermined amount of time has elapsed, that the second logical link according to the second networking protocol is active.

19. The first network device of claim 18, wherein the predetermined amount of time is a length of time of a duplicate address detection (DAD) operation for the second logical link according to the second networking protocol.

20. A non-transitory, computer-readable medium comprising instructions that, when executed, are configured to cause processing circuitry of a first network device of a plurality of network devices in a network operating in accordance with a link state routing protocol to:
execute a link state routing protocol adjacency state machine configured to:
determine that a first logical link according to a first networking protocol is active, wherein the first logical link is established on a first physical link between the first network device and a second network device of the plurality of network devices; and
determine that a second logical link according to a second networking protocol is active, wherein the second logical link is established on the first physical link between the first network device and the second network device, and wherein the first networking protocol and second networking protocol are different,
wherein, in response to determining that the first logical link is active and determining that the second logical link is active, the processing circuitry is further configured to:

output a first link state routing advertisement advertising the first logical link; and output a second link state routing advertisement advertising the second logical link.

* * * * *